United States Patent [19]
Gentile

[11] Patent Number: 6,062,629
[45] Date of Patent: May 16, 2000

[54] METHOD AND APPARATUS FOR PROTECTING AN EXTERIOR OF A VEHICLE

[76] Inventor: Edward Gentile, 135-20 118th St., South Ozone Park, N.Y. 11420

[21] Appl. No.: 09/046,208

[22] Filed: Mar. 23, 1998

Related U.S. Application Data

[63] Continuation-in-part of application No. 08/964,185, Nov. 4, 1997
[60] Provisional application No. 60/029,874, Nov. 6, 1996, and provisional application No. 60/031,250, Nov. 12, 1996.

[51] Int. Cl.$^7$ ........................................................ B60J 11/00
[52] U.S. Cl. ............................................................... 296/136
[58] Field of Search ............................................. 296/136

[56] References Cited

U.S. PATENT DOCUMENTS

| | | | |
|---|---|---|---|
| 2,082,791 | 6/1937 | Copeman | 296/136 |
| 5,050,925 | 9/1991 | Brown . | |
| 5,158,324 | 10/1992 | Flesher | 296/136 |
| 5,280,989 | 1/1994 | Castillo | 296/136 |
| 5,820,201 | 10/1998 | Jabalee | 296/136 |

*Primary Examiner*—Gary C. Hoge
*Attorney, Agent, or Firm*—Michael I. Kroll

[57] ABSTRACT

A method and apparatus for protecting an area of an exterior of a vehicle from damage due to contact from debris and other objects. The method comprises the steps of forming a template by tracing the area to be protected, position template over material used to form protective covering and cutting protective covering to match traced pattern. Once cut, the protective covering is divided into pieces having dimensions less than 18 inches by 18 inches. The area to be protected is then cleaned and dried. After cleaning, the area should be waxed and buffed. If the area has been oxidized or is abused a compound should be applied prior to waxing. The protective cover is grasped, the static charge is increased by rubbing with a cloth or applying a desiccant and positioned over the area to be protected. A force is applied towards the area to be protected causing the protective cover to adhere to the area by static electricity. The process is repeated with each section of the protective cover until the desired area is covered by the protective cover. The protective cover is preferably formed from "FLEXcon CV-800 100PW" or a Poly Vinyl Chloride with a high concentration of plasticizer. The protective cover is also pliable, clear and transparent so as not to affect the appearance of the vehicle when applied. Furthermore, it is easily removed by grasping a corner thereof and applying a force in a direction away from the vehicle.

17 Claims, 4 Drawing Sheets

| | VEHICLE (AIRCRAFT, AUTOMOTIVE ETC.) PAINT PROTECTION SYSTEM |
|---|---|
| | FABRICATE FROM "FLEXcon CV-800 100PW" |
| S2 | PREPARE TEMPLATE FOR PARTICULAR SHAPE(S) OR APPLICATION(S) |
| | MINIMIZE SIZE OF COMPONENTS |
| S4 | OVERLAY TEMPLATE ON MATERIAL AND CUT SHAPE |
| S6 | ASSEMBLE CUT SHAPES FOR PACKAGING |
| S8 | CLEAN AND DRY AREA OF VEHICLE TO WHICH PROTECTIVE COVER WILL BE ADHERED - REPEAT AS NECESSARY WITH EACH SECTION FORMING THE PROTECTIVE COVER |
| S10 | ENHANCE STATIC RETENTION OF CUT COMPONENTS FOR SUPERIOR ADHERENCE BY APPLYING A DESICANT INCLUDED IN PACKAGING AND/OR INCREASING STATIC CHARGE OF EACH COMPONENT BEFORE INSTALLING ON VEHICLE BY FRICTION-RUBBING COMPONENT MATERIAL WITH SOFT CLOTH |
| S12 | POSITION COMPONENT ON VEHICLE, APPLY PRESSURE AND WORK OUT ANY AIR BUBBLES |
| S14 | APPLICATION COMPLETED |
| S16 | REPEAT AS NECESSARY WITH EACH SECTION FORMING THE ENTIRE PROTECTIVE COVER |

Fig. 7

METHOD AND APPARATUS FOR PROTECTING AN EXTERIOR OF A VEHICLE

CROSS REFERENCE TO RELATED APPLICATIONS

This application is a continuation in part application of U.S. patent application Ser. No. 08/964,185 filed on Nov. 4, 1997, which claims the benefit of U.S. Provisional Application No. 60/029,874 filed Nov. 6, 1996 and U.S. Provisional Application No. 60/031,250 filed Nov. 12, 1996.

BACKGROUND OF THE INVENTION

1. Field of the Invention

The present invention relates generally to devices for protecting vehicles from damage to external paint and, more specifically, to a method and apparatus for protecting an exterior surface of a vehicle whereby a protective covering is molded to the shape of at least a section of the area to be protected and is removably adhere thereto for protecting the vehicle's exterior from damage caused by debris striking the vehicle.

2. Description of the Prior Art

Numerous devices for protecting the exterior of a vehicle have been provided in the prior art. For example, U.S. Pat. Nos. 5,050,925 and 5,280,989 are illustrative of such prior art. Thus, while these units may be suitable for the particular purpose to which they address, they would not be as suitable for the purposes of the present invention as heretofore described.

A removable protective padding for preventing chips, dents, scrapes and nicks to the doors and sides of a parked vehicle which is covered by this protective padding. This padding will extend from just front of the front door edge to just front of the rear wheel well. It is held in position by magnets. The height of the protective pad is typically about twenty inches and covers only the area most susceptible to damage from the opening of doors of adjacently parked vehicles. The plastic is a clear plastic such as polyvinyl chloride. It is placed on the car side when it is parked and is removed when it is to be driven.

An improved halter type protective cover is constructed out of static cling vinyl cut to fit over the front part of the hood and front fenders of a car to protect the finish from dirt, bug stains, road grime, tar, flying particles, stones and similar damaging material. It is fastened to the front end by means of the electrostatic properties of the material and without the use of adhesives.

SUMMARY OF THE PRESENT INVENTION

The present invention relates generally to devices for protecting vehicles from damage to external paint and, more specifically, to a method and apparatus for protecting an exterior surface of a vehicle whereby a protective covering is molded to the shape of at least a section of the area to be protected and removably adhered thereto for protecting the vehicle's exterior from damage caused by debris striking the vehicle.

A primary object of the present invention is to provide a method and apparatus for protecting an exterior surface of a vehicle that will overcome the shortcomings of prior art devices.

Another object of the present invention is to provide a method and apparatus for protecting an exterior surface of a vehicle which includes a clear and pliable molded material able to adhere to the exterior of the vehicle.

A further object of the present invention is to provide a method and apparatus for protecting an exterior surface of a vehicle which is able to prevent damage to the exterior paint on the vehicle.

An additional object of the present invention is to provide a method and apparatus for protecting an exterior surface of a vehicle which is easily removed from the vehicle without damage to the exterior paint of the vehicle.

A further object of the present invention is to provide a method and apparatus for protecting an exterior surface of a vehicle which may be quickly installed and is specially molded to conform to the shape of the particular vehicle to which it is adhered.

A yet further object of the present invention is to provide a method and apparatus for protecting an exterior surface of a vehicle which adheres to the vehicle via static electricity whereby pieces of the protective covering are of a size small enough to prevent air bubbles forming between the vehicle and the protective covering while providing a strong enough bond to prevent the protective covering from falling off and make the protective covering easy and manageable to work with.

A still further object of the present invention is to provide a method and apparatus for protecting an exterior surface of a vehicle which is clear and transparent thereby eliminating the need to match the protective covering to the particular color of paint on the vehicle.

Another object of the present invention is to provide a protective covering for vehicles that is simple and easy to use.

A still further object of the present invention is to provide a protective covering for vehicles that is economical in cost to manufacture.

Additional objects of the present invention will appear as the description proceeds.

A method and apparatus for protecting an area of an exterior of a vehicle from damage due to debris and other objects contacting the vehicle. The method comprises the steps of forming a template by tracing the area to be protected, position template over pliable material used to form protective covering and cutting protective covering to match traced pattern on template. Once cut, the protective covering is divided into pieces having dimensions less than 18 inches by 18 inches. The area to be protected is then cleaned and dried. After cleaning the area to be protected should be waxed and buffed. If the area has been oxidized or is abused a compound should be applied prior to waxing. It is now time to apply the protective covering to the area to be protected. The static charge on one side of protective cover is increased and the protective cover is grasped and positioned over the area to be protected. A force is now applied in a direction towards the area to be protected causing the protective cover to contact and adhere to the area to be protected by static electricity. The process is repeated from the step of grasping the protective cover with each section of the protective cover until the desired area to be protected is covered by the protective cover. The protective cover is preferably formed from "FLEXcon CV-800 100PW" material or a Poly Vinyl Chloride material having a high concentration of plasticizer which is pliable. The protective cover is also clear and transparent so as not to affect the appearance of the vehicle when applied. Furthermore, the protective cover is easily removed by simply grasping a corner thereof and applying a palling force in a direction away from the vehicle.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

FIG. 7 is a flow diagram describing the process of producing and applying the protective covering for vehicles of the present invention.

DESCRIPTION OF THE REFERENCED NUMERALS

Figure 1:
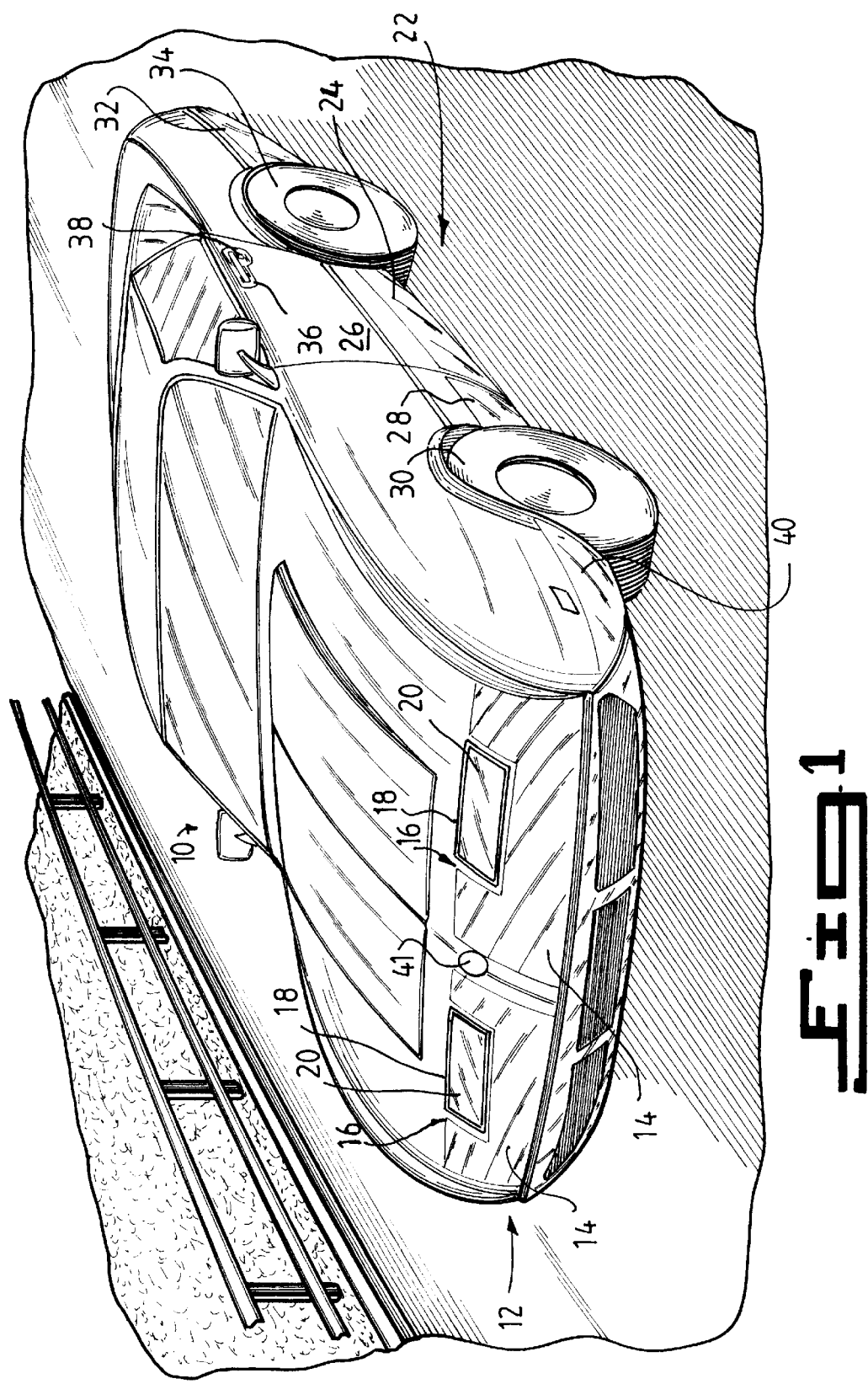
FIG. 1 is a front perspective view of a vehicle including the protective covering for vehicles of the present invention covering and protecting a portion of the vehicle's exterior.

Turning now descriptively to the drawings, in which similar reference characters denote similar elements throughout the several views, the Figures illustrate the apparatus for protecting an exterior surface of a vehicle of the present invention. With regard to the reference numerals used, the following numbering is used throughout the various drawing figures.

10 vehicle including the apparatus for protecting an exterior surface of a vehicle of the present invention applied to selected areas thereof
12 front end of vehicle
14 apparatus for protecting an exterior surface of a vehicle of the present invention molded to protect a portion of the nose of the vehicle
16 pop-up headlights of vehicle
18 cover surface of pop-up headlights
20 apparatus for protecting an exterior surface of a vehicle of the present invention molded to protect cover surface of pop-up headlights
22 side of vehicle
24 apparatus for protecting an exterior surface of a vehicle of the present invention molded to protect base of a door of the vehicle
26 door of vehicle
28 apparatus for protecting an exterior surface of a vehicle of the present invention molded to protect area behind a front tire of vehicle
30 front tire of vehicle
32 apparatus for protecting an exterior surface of a vehicle of the present invention molded to protect area behind rear tire of vehicle
34 rear tire of vehicle
36 apparatus for protecting an exterior surface of a vehicle of the present invention molded to cover area surrounding door lock
38 key hole on door of vehicle
40 apparatus for protecting an exterior surface of a vehicle of the present invention molded to protect area in front of front tire of vehicle
41 apparatus for protecting an exterior surface of a vehicle of the present invention molded to protect insignia on hood of vehicle
42 contour behind front tire of vehicle
44 apparatus for protecting an exterior surface of a vehicle of the present invention molded to protect contour behind front tire of vehicle
46 indentation behind front tire of vehicle
48 apparatus for protecting an exterior surface of a vehicle of the present invention molded to protect indentation behind front tire of vehicle
50 motorcycle
52 handlebars of motorcycle
54 seat of motorcycle
56 gas tank of motorcycle
58 gas cap for covering fuel line of motorcycle
60 apparatus for protecting an exterior surface of a vehicle of the present invention molded to protect gas tank of motorcycle

DETAILED DESCRIPTION OF THE PREFERRED EMBODIMENT

Turning now descriptively to the drawings, in which similar reference characters denote similar elements throughout the several views, FIGS. 1–6 illustrate the apparatus for protecting an exterior surface of a vehicle of the present invention positioned to protect selected areas of an exterior surface of a vehicle 10.

The apparatus for protecting an exterior surface of a vehicle of the present invention is clearly illustrated in FIG. 1. The apparatus for protecting an exterior surface of a vehicle encompasses at least one and preferably several protective covers removably adhered to specific areas of the vehicle 10 for protecting those areas form flying debris and other objects which may damage the exterior surface of the vehicle 10. The areas covered are normally those most likely to be damaged by flying debris on the roads and other objects such as a swinging door of another vehicle parked in an adjacent parking spot.

The vehicle 10 illustrated in FIG. 1 includes a front end 12. The front end 12 of the vehicle is especially subject to damage due to debris present on the road and objects kicked up by other vehicles. The apparatus for protecting an exterior surface of a vehicle may be molded to match the shape of the front end 12 of the vehicle 10 as illustrated by the protective covering 14. Certain vehicles also include "pop-up" headlights 16 which, when not in use, are housed below the exterior surface of the vehicle 10. As the headlights 16 are positioned at the front end 12 of the vehicle 10, they are also subject to impact from debris present on the roadway and kicked up by other vehicles on the road. These headlights 16 include a cover surface 18 to provide a smooth finish to the exterior of the vehicle 10 and act to hide the headlights 16. A protective cover 20 in accordance with the present invention may be molded to the shape of the cover surface 18 for protecting the cover surface 18.

The side 22 of the vehicle 10 is also subject to flying debris and may be likewise protected by the apparatus for protecting an exterior surface 10 of a vehicle of the present invention. FIG. 1 illustrates a protective cover 24 molded to the shape of the base of the door 26 to protect the door 26 from scratches and damage to the exterior surface and paint job caused by hitting a sidewalk or other object when the door swings open. A protective cover 28 molded to the shape of the area behind the front tires 30 of the vehicle 10 and a protective cover 32 molded to the shape of the area behind the rear tires 34 of the vehicle 10 are also provided to protect the vehicle 10 from mud and debris kicked up by the front and rear tires 30 and 34, respectively. A protective cover 36 molded to fit around the key hole 38 is also provided by the present invention to provide protection caused by scratching the door 26 with a key when attempting to unlock the door 26. A protective covering 40 may also be provided to protect the vehicle 10 in the area in front of the front tire 30.

Figure 2:
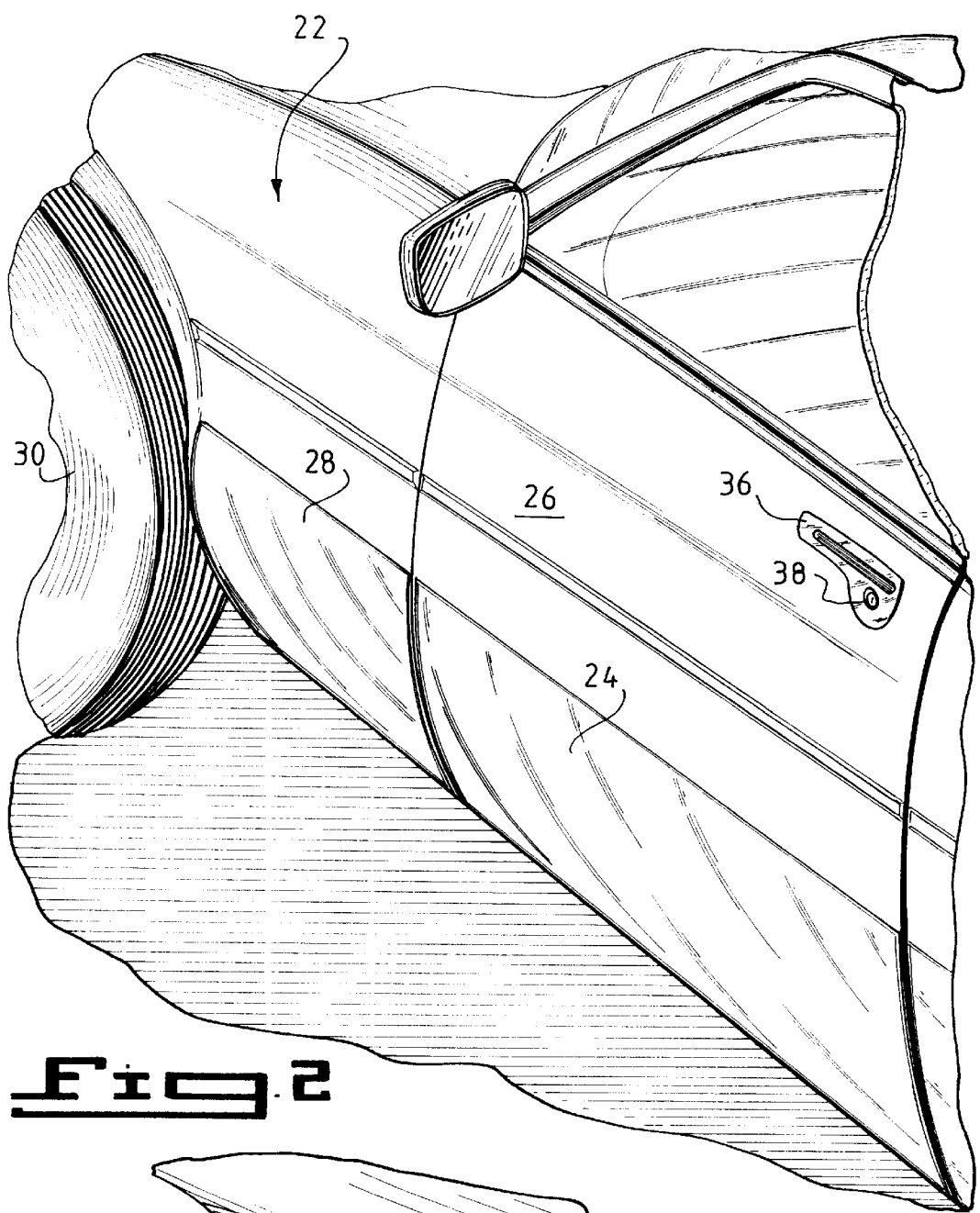
FIG. 2 is an exploded side view of a portion of the vehicle illustrated in FIG. 1 including the protective covering for vehicles of the present invention covering a portion thereof.

An enlarged view of the side 22 of the vehicle 10 is illustrated in FIG. 2. From this figure, the protective cover 24 positioned at the base of the door 26, the protective cover 28 behind the front wheel 30 and the protective cover 36 surrounding the key hole 38 are clearly seen. These protective covers are specially molded to match the shape of the vehicle surface on which they are placed. These protective covers may be mass produced to match the shape of a particular area of a particular make and model of vehicle thus eliminating the need to produce individual protective covers for each individual vehicle. A person may then determine which areas of the vehicle are desired to be protected and simply purchase a ready made protective cover for the area of the make and model car to be protected.

The protective covers 24, 28 and 36 are clear and transparent in color and are of a thickness within a range of from 6 mil. to 10 mil. Due to the clear transparent color and minimal thickness of the protective covers, the paint color of the vehicle on which the protective covers are adhered is visible therethrough without being distorted. Therefore, when selecting the protective covers to be adhered to a vehicle, there is no need to match the protective cover to the paint color of the vehicle 10. Furthermore, the protective covers are also pliable and thus can easily conform to the shape of the area of the vehicle to be protected. Thus, the vehicle will appear as if the protective covers are not adhered thereto.

Each protective cover should be at most 18 inches in length by 18 inches in height and preferably no larger than 1 square foot in area. The dimensions of each protective cover is critical as larger sizes will be more difficult to adhere to the vehicle with unsightly air bubbles forming between the protective cover and the vehicle. Furthermore, the presence of the air bubbles will decrease the adherence ability of the protective cover. If an area larger than 1 square foot is desired to be protected, more than one protective cover should be used and placed adjacent each other to appear as a single sheet.

Figure 3:
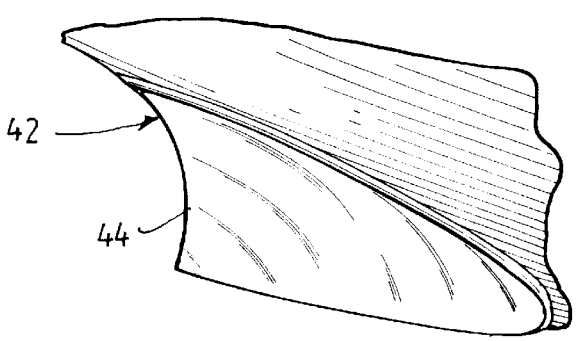
FIG. 3 is a partial side view of the protective covering for vehicles of the present invention specially molded for and applied to a contoured area of a vehicle.

FIG. 3 illustrates a portion of a classic corvette automobile which includes a contoured area 42 behind the front tire. This contoured area 42 is exclusive to this make and model of vehicle and would need a specially molded protective cover 44 to protect the area 42 from debris kicked up by the front tires. As the apparatus of the present invention is especially useful for protecting classic automobiles while not altering their appearance by utilizing protective covers for protecting unique areas of the particular vehicles which are readily available without any special or individual production needed.

Figure 4:
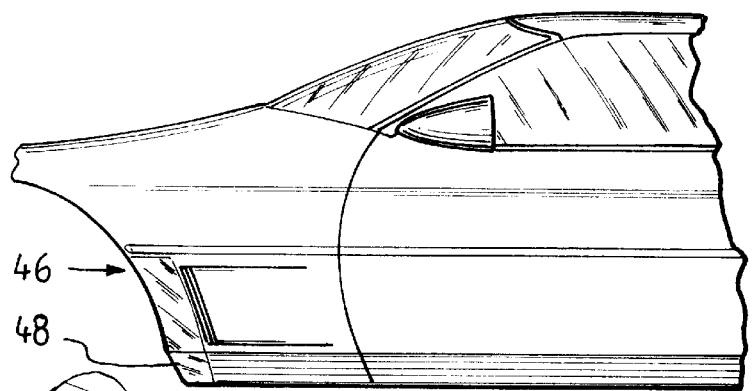
FIG. 4 is a side view of a vehicle including the protective covering for vehicles of the present invention molded to fit around the wheel portion thereof.

A side view of another vehicle is illustrated in FIG. 4. This figure also shows a unique style molding 46 positioned behind the front tire. Such specially designed and styled areas are easily protected by the protective cover 48 of the present invention. Due to the negligible thickness and the pliability of the material the protective covers may be molded and shaped to a form for any particular area of any make or model of vehicle. Furthermore, due to the size requirements of each piece forming the protective covers, any area may be protected by placing any number of protective covers adjacent each other.

Figure 5:
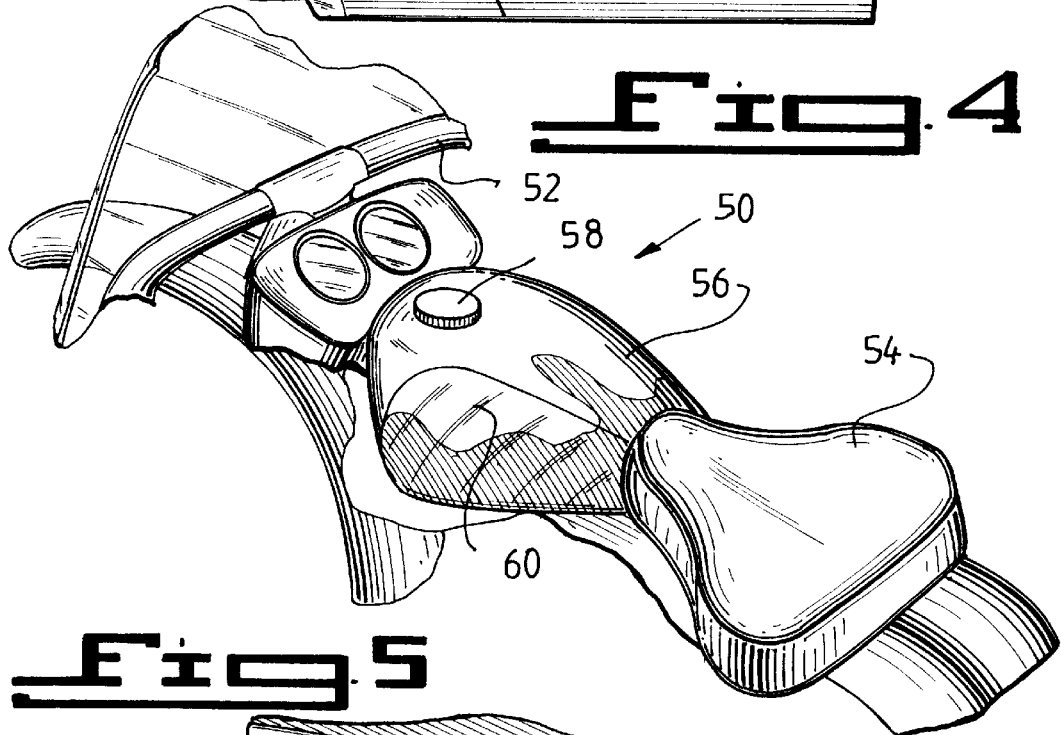
FIG. 5 is a top perspective view of the protective covering for vehicles of the present invention positioned to cover an exterior portion of a motorcycle.

The protective covers forming the apparatus for protecting an exterior surface of a vehicle of the present invention may also be used to protect areas of a motorcycle 50 as is illustrated in FIG. 5. As can be seen from this figure, the motorcycle 50 is a conventionally known motorcycle and includes handlebars 52, a seat 54 and a gas tank 56 having a cap 58 to cover the fuel line. When a user of the motorcycle 50 hops on and off, the gas tank 56 will be contacted by the legs and shoes of the user. This contacting of the gas tank 56 can dent the gas tank 56 and scratch the paint thereon. A protective cover 60 formed in accordance with the method of the present invention may be positioned to cover the gas tank 56 and prevent the paint covering the gas tank 56 from being scratched and dented. The protective cover 60 is formed in the same manner as the protective covers described above with respect to the vehicles illustrated in FIGS. 1–4 for protecting an automobile. In actuality, the protective covers of the present invention may be used to protect any surface to which it can removably adhere. Such surfaces include the exterior painted surface of any vehicle including boats, air planes, vans, jeeps, recreational vehicles, etc.

Figure 6:
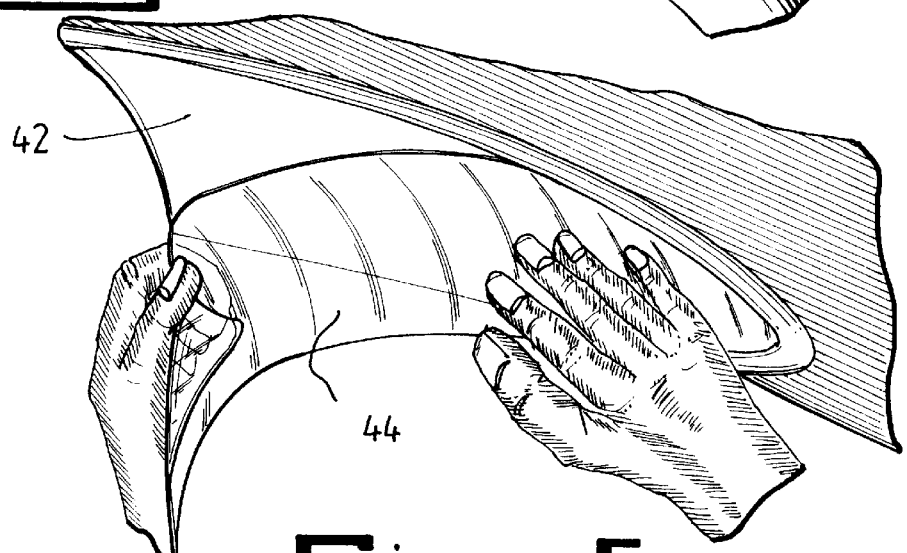
FIG. 6 is a top perspective view illustrating a person applying the protective covering for vehicles of the present invention to a vehicle.

FIG. 6 illustrates a user applying a protective cover 44 to a contoured area 42 behind a front tire as illustrated in FIG. 3. Prior to the application of the protective cover 44 the area to be protected must be thoroughly cleaned preferably with water. Once the area is dried, it is waxed and buffed to a shine. If the area to be protected has been oxidized or abused, a compound must be applied prior to waxing to further protect the area. The static charge on the adhering side of the protective cover is then increased by rubbing with a cloth or applying a desiccant thereto. The protective cover is now ready to be applied to the area to be protected. To apply the protective cover, the user will grasp the protective cover and place it over the area to be protected. A force is then applied by the user causing the protective cover to contact the area of the vehicle to be protected. When the protective cover contacts the area to be protected, the static charge built up on the side of the protective cover will cause it to adhere to the area on which it is placed. The user will then continue to apply pressure to the protective cover. The user will then slide one hand over the protective cover from the center of the protective cover and out towards the ends thereof, holding the cover in place with the other hand. This causes the entire surface of the protective cover to adhere to the area to be protected and eliminates any air bubbles which may form between the protective cover and the area being protected. As the size of the protective cover is limited, the possibility of air bubbles forming is further minimized. Furthermore, the weight of the protective cover is minimal due to its size and thickness that the static charge is easily able to overcome the gravitational pressure on the protective cover thereby minimizing the possibility of the protective cover falling from its position.

Preferably, the protective covers are formed from either "FLEXcon CV-800 100PW" material or a Poly Vinyl Chloride having a high plasticizer concentration. This material is clear and transparent in color and is pliable to conform easily to the shape of the area to which it is to protect. Furthermore, the material is easily cut to the correct shapes and is able to hold an electrostatic charge for use in adhering to the vehicle it is to protect.

The method of producing and applying the protective coverings for vehicles 10 in accordance with the present invention will now be described with reference to the figures and specifically FIG. 7. In order to prepare a protective cover of a desired shape to fit the area to be protected, a template must first be formed by tracing the area to be protected. The area is traced on a template, e.g. a piece of paper, which can be positioned to cover the entire area including any indentations which must be accounted for and curves in the shape of the vehicle. The template material will be held to the area to be protected and the entire area to be protected will be traced as stated in step S2.

Once the template is formed, it will be laid out on a piece of either "FLEXcon CV-800 100PW" material or Poly Vinyl Chloride material having a high plasticizer concentration and the shape of the template will be used to cut the piece therefrom to form an identical shape as stated in step S4. The cut piece of material will then be divided into smaller pieces not larger than 18 inches by 18 inches and preferably with a size of not greater than 1 square foot. The template can then be used again to produce additional cut pieces for mass distribution. The cut pieces are then packaged for delivery to the consumer either directly or at distribution points such as commercial establishments as stated in step S6.

Upon acquiring a protective cover having a shape identical to that of the intended area of protection the user must now thoroughly clean the area to be protected and then dry the area as described in step S8. The cleaning of the area is preferably performed with water and some form of soap. The cleaned area is then waxed and buffed to a shine. If the paint is oxidized or abused, a protective compound must be applied prior to waxing. The static charge on the adhering side of the protective cover is then increased by either rubbing the protective cover with a cloth or applying a desiccant thereto as stated in step S10. The increasing of the static charge by either rubbing the protective cover with a cloth or applying a desiccant thereto is performed in each individual piece forming the entire protective cover.

The protective cover is now ready to be applied to the area to be protected. To apply the protective cover, the user will grasp the protective cover and position it over the area to be protected. A force is then applied by the user causing the protective cover to contact the area of the vehicle to be protected. When the protective cover contacts the area to be protected, the static charge built up on the side of the protective cover will cause it to adhere to the area on which it is placed. The user will then continue to apply pressure to the protective cover. The user will then slide one hand over the protective cover starting at the center of the protective cover and moving towards the ends of the protective cover, holding the cover in place with the other hand. This application process is discussed in step S12. This causes the entire surface of the protective cover to adhere to the area to be protected and eliminates any air bubbles which may form between the protective cover and the area being protected. As the size of the protective cover is limited, the possibility of air bubbles forming is further minimized. Furthermore, the weight of the protective cover is minimal due to its size and thickness that the static charge is easily able to overcome the gravitational pressure on the protective cover thereby minimizing the possibility of the protective cover falling from its position. One section of the protective cover is now applied as stated in step S14. This process beginning with step S8 is to be is repeated with each section forming the protective cover until each desired section is applied as stated in step S16.

From the above description it can be seen that the method and apparatus for protecting an exterior surface of a vehicle of the present invention is able to overcome the shortcomings of prior art devices by providing a method and apparatus for protecting an exterior surface of a vehicle which includes a clear molded material able to adhere to the exterior of the vehicle and prevent damage to the exterior paint on the vehicle. The apparatus for protecting an exterior surface of a vehicle is formed by a method which molds the material to a shape of at least a portion of the area to be covered, depending on the size of the area, may be quickly installed by rubbing the material with a soft cloth or applying a desiccant to create and increase a static charge on the material and positioning the material over the area and applying a pressure thereto. The apparatus for protecting an exterior surface of a vehicle is easily removed from the vehicle without damage to the exterior paint of the vehicle by applying a force away from the vehicle and pealing it off. The apparatus for protecting an exterior surface of a vehicle adheres to the vehicle via static electricity whereby pieces of the protective covering are of a size small enough to make them easy and manageable to work with and prevent air bubbles forming between the vehicle and the protective covering while providing a strong enough bond to prevent the protective covering from falling off and is transparent thereby eliminating the need to match the protective covering to the particular color of paint on the vehicle. Furthermore, the method and apparatus for protecting an exterior surface of a vehicle of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A method of protecting an area of an exterior of a vehicle from damage due to debris and other objects contacting the vehicle, comprising the steps of:

a) forming a template by tracing the area to be protected;

b) positioning the template over a pliable material used to form the protective covering;

c) cutting the protective cover to a shape substantially matching the traced pattern on the template;

d) dividing the protective cover into pieces having a length of at most 18 inches and width of at most 18 inches;

e) cleaning and drying the area to be protected;

f) increasing the static charge on one side of protective cover;

g) grasping the protective cover and positioning the protective cover over the area to be protected;

h) applying force in direction of area to be protected causing the protective cover to contact and adhere to the area to be protected by static electricity; and i) repeating the method from step (f) with each section of the protective cover until the desired area to be protected is covered by the protective cover.

2. The method of claim 1, further comprising the step of applying a sliding pressure is applied along a second surface of the protective cover causing the protective cover to adhere to the area to be protected and eliminating any air bubbles which may form between the protective cover and the area being protected.

3. The method of claim 1, further comprising the step of applying a pulling force in a direction away from the vehicle to remove the protective cover from the vehicle.

4. The method of claim 1, wherein said step of increasing the static charge is performed by rubbing one side of the protective cover with a cloth.

5. The method of claim 1, wherein said step of increasing the static charge is performed by applying a desiccant to one side of the protective cover.

6. The method of claim 1, wherein said step of dividing divides the protective covering into pieces having an area of at most 1 square foot.

7. The method of claim 1, further comprising the step of cleaning is performed using water and soap.

8. The method of claim 1, further comprising the step of waxing and buffing the area to be protected after said step of cleaning.

9. The method of claim 8, further comprising the step of applying a compound to the area to be cleaned prior to said step of waxing and buffing if the area to be protected is one of oxidized and abused.

10. The method of claim 1, wherein said pliable material used to form the template is one of "FLEXcon CV-800 100PW" material and Poly Vinyl Chloride having a high plasticizer concentration.

11. The method of claim 1, wherein said pliable material used has a thickness within a range of 6 mil. to 10 mil.

12. A covering for protecting an area of an exterior of a vehicle from damage due to debris and other objects contacting the vehicle, said protective covering including a plurality of sections formed from a pliable material and having a length of at most 1 foot and a width of at most 1 foot, said plurality of sections of said protective covering having a shape substantially matching a shape of the area being protected and able to retain a static charge for removably adhering to the area being protected, wherein said maximum length and width of each of said plurality of sections of said protective cover providing a maximum adherence force for retaining said plurality of sections in a position covering the area to be protected.

13. The protective covering for vehicles as recited in claim 12, wherein said protective covering has a thickness within a range of substantially 6 mil. to 10 mil.

14. The protective covering for vehicles as recited in claim 12, wherein said pliable material used to form the template is one of "FLEXcon CV-800 100PW" material and Poly Vinyl chloride having a high plasticizer concentration.

15. A method of protecting an area of an exterior of a vehicle from damage due to debris and other objects contacting the vehicle, comprising the steps of:

a) cleaning and drying the area to be protected;

b) increasing a static charge on one side of the protective cover;

c) grasping the protective cover and positioning the protective cover over the area to be protected;

d) applying force in direction of area to be protected causing the protective cover to contact and adhere to the area to be protected by static electricity; and e) repeating the method from step (f) with each section of the protective cover until the desired area to be protected is covered by the protective cover.

16. The method of claim 15, further comprising the step of waxing and buffing the area to be protected after said step of cleaning.

17. The method of claim 16, further comprising the step of applying a compound to the area to be cleaned prior to said step of waxing and buffing if the area to be protected is one of oxidized and abused.

* * * * *